(12) United States Patent
Fujita (10) Patent No.: US 8,841,599 B2
(45) Date of Patent: Sep. 23, 2014

(54) OPTICAL SENSOR

(75) Inventor: Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 442 days.

(21) Appl. No.: 13/180,818

(22) Filed: Jul. 12, 2011

(65) Prior Publication Data

US 2012/0012740 A1 Jan. 19, 2012

(30) Foreign Application Priority Data

Jul. 14, 2010 (JP) .................. 2010-160029

(51) Int. Cl.
*G01D 5/347* (2006.01)
(52) U.S. Cl.
CPC .......... *G01D 5/3473* (2013.01); *G01D 5/34715* (2013.01)
USPC ..................................... 250/231.1
(58) Field of Classification Search
CPC ........... G01D 5/347; H01J 40/14; H01J 40/00
USPC .................. 250/231.1–231.19, 551, 552; 257/290–292
See application file for complete search history.

(56) References Cited

U.S. PATENT DOCUMENTS 5,654,559 A * 8/1997 Spaeth et al. ................. 250/551
5,874,730 A * 2/1999 Yi et al. ..................... 250/214 R

FOREIGN PATENT DOCUMENTS

JP 62-178311 U 11/1987
JP 2004-45284 2/2004

OTHER PUBLICATIONS

Japanese Office Action dated Jan. 14, 2014 from related Japanese Application No. 2010-160029, together with an English language translation.

* cited by examiner

*Primary Examiner* — Seung C Sohn
(74) *Attorney, Agent, or Firm* — Scully, Scott, Murphy & Presser, P.C.

(57) ABSTRACT

According to one embodiment, an optical sensor includes a photodetector and a substrate. The photodetector detects light. The substrate in which the photodetector is received includes at least three layers including a cover layer, a spacer layer, and a base layer. The substrate includes an electrical conductive portion for the photodetector.

10 Claims, 7 Drawing Sheets

OPTICAL SENSOR

CROSS-REFERENCE TO RELATED APPLICATIONS

This application is based upon and claims the benefit of priority from prior Japanese Patent Application No. 2010-160029, filed Jul. 14, 2010, the entire contents of which are incorporated herein by reference.

BACKGROUND OF THE INVENTION

1. Field of the Invention

The present invention relates to an optical sensor.

2. Description of the Related Art

Figure 10:
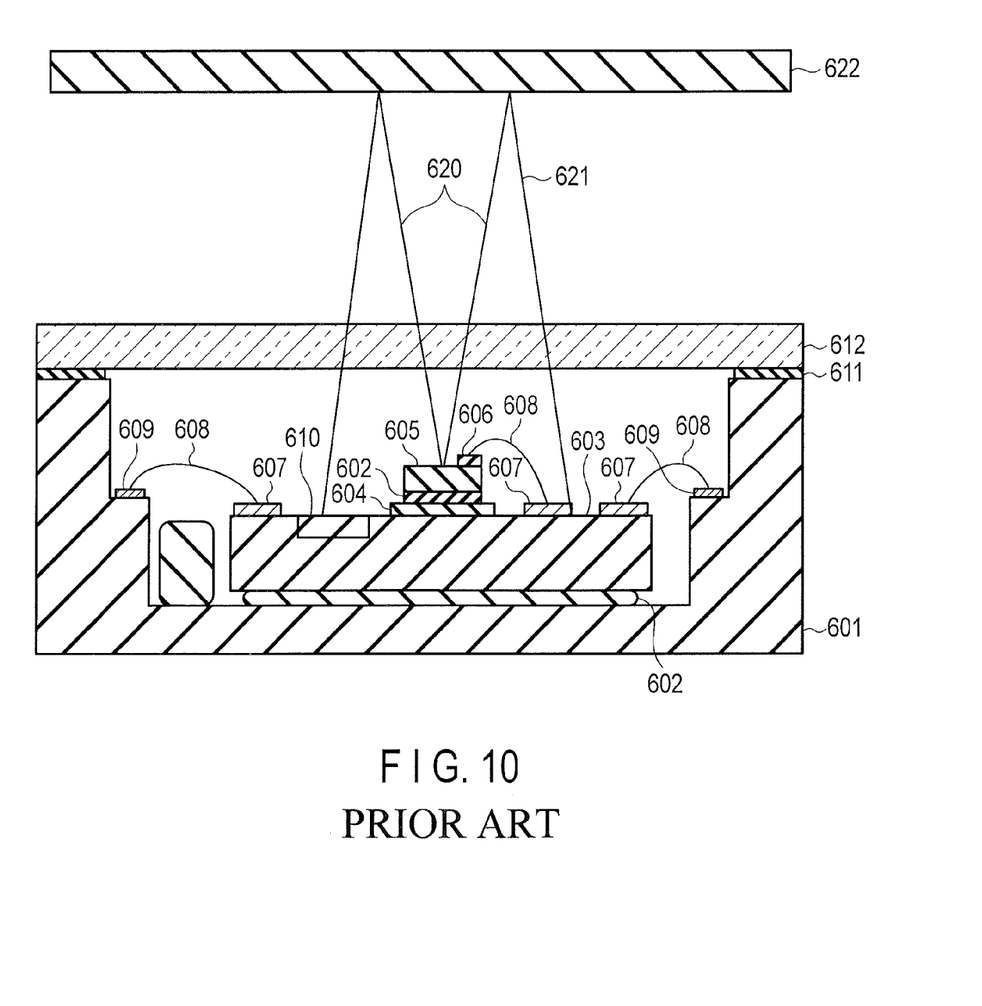
FIG. 10 is a side sectional view showing a conventional optical encoder.

A general optical sensor adopts an arrangement as disclosed in, e.g., Jpn. Pat. Appln. KOKAI Publication No. 2004-45284. FIG. 10 is a side sectional view showing the sectional structure of an optical encoder disclosed in Jpn. Pat. Appln. KOKAI Publication No. 2004-45284. As shown in FIG. 10, an IC chip 603 which integrates a photodetector (PD) 610 serving as an optical functional element, e.g., light detection functional element is mounted on the internal bottom of a ceramic package 601 via an Ag paste portion 602.

An electrode land 604 is formed on the IC chip 603. The electrode land 604 ensures electrical connection with the lower portion of a surface emitting laser (SEL) 605 via the Ag paste portion 602.

An Au wiring line 608 ensures electrical connection between an upper electrode 606 on the surface emitting laser (SEL) 605 and an electrode pad 607 formed on the IC chip 603. Also, the Au wiring line 608 ensures electrical connection between an electrode 609 formed inside the ceramic package 601 and the electrode pad 607 on the IC chip 603. This structure electrically connects the IC chip 603 and ceramic package 601. A glass member 612 is bonded to the upper surface of the ceramic package 601 via a resin adhesive 611.

Reference numeral 622 denotes a detection target; and 620 and 621, laser beams.

The above-described structure provides an optical encoder in which the ceramic package 601 incorporates the IC chip 603 which integrates the photodetector 610, the Au wiring line 608 electrically connects the IC chip 603 and ceramic package 601, and the glass member 612 covers the ceramic package 601 to protect connections by the Au wiring lines 608, the IC chip 603, and the like.

The conventional optical sensor described above becomes thick to a certain degree owing to its structure. That is, it is very difficult to reduce the thickness.

More specifically, the following factors thicken the optical sensor.

A space needs to be ensured in the direction of height of the ceramic package 601 in order to incorporate the IC chip 603 in the ceramic package 601 and electrically connect the ceramic package 601 and IC chip 603 via the Au wiring line 608.

A space needs to be ensured in the direction of height of the ceramic package 601 not to apply force to the Au wiring line 608.

The glass member 612 needs to have a predetermined thickness in consideration of strength, and this arrangement thickens the optical sensor.

To electrically connect the ceramic package 601 and IC chip 603 by the Au wiring line 608, even the interval between the ceramic package 601 and the chip 603 needs to be ensured to a certain degree (an area for them is required).

Hence, the conventional optical sensor becomes larger than the IC chip 603. Such large dimensions hinder the use of the conventional optical sensor at a location where it is difficult to ensure an installation space of predetermined dimensions.

BRIEF SUMMARY OF THE INVENTION

The present invention has been made in consideration of the above situations, and has as its object to provide a low-profile optical sensor while maintaining desired detection precision.

To achieve the above object, according to an aspect of the present invention, there is provided an optical sensor comprising:

a photodetector which detects light; and a substrate in which the photodetector is buried and includes at least three laminated layers including a cover layer, a spacer layer, and a base layer, wherein the substrate includes an electrical conductive portion for the photodetector.

The present invention can provide a low-profile optical sensor while maintaining desired detection precision.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An optical sensor according to preferred embodiments of the present invention will now be described with reference to the accompanying drawing.

First Embodiment

Figure 1:
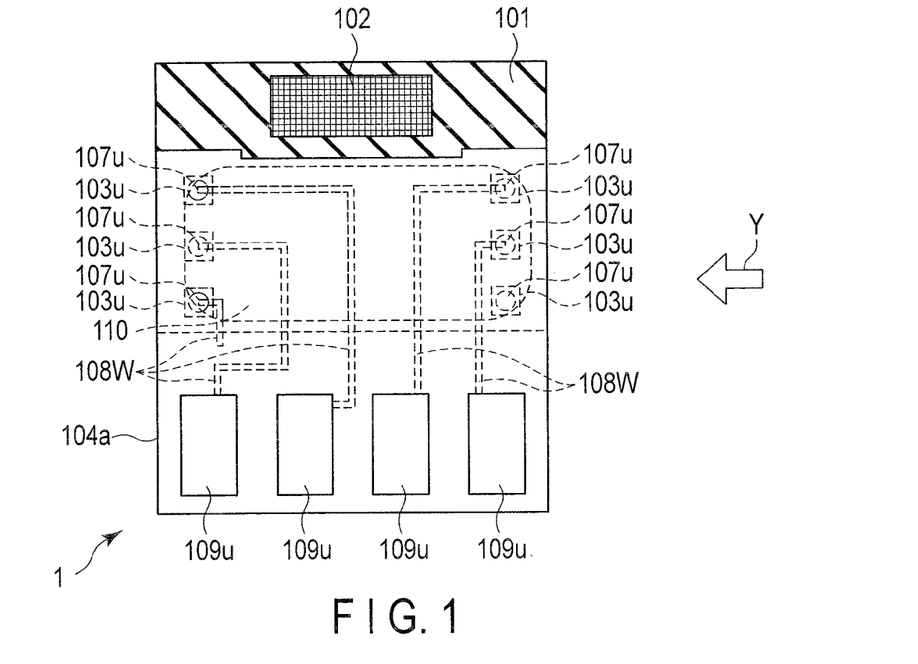
FIG. 1 is a plan view showing an optical sensor according to the first embodiment.

An optical sensor according to the first embodiment of the present invention will be described. FIG. 1 is a plan view showing the optical sensor according to the first embodiment. In the plan view shown in FIG. 1, broken lines indicate building components which are invisible when the optical sensor is viewed from the top. For illustrative convenience, some building components are not illustrated.

Figure 2:
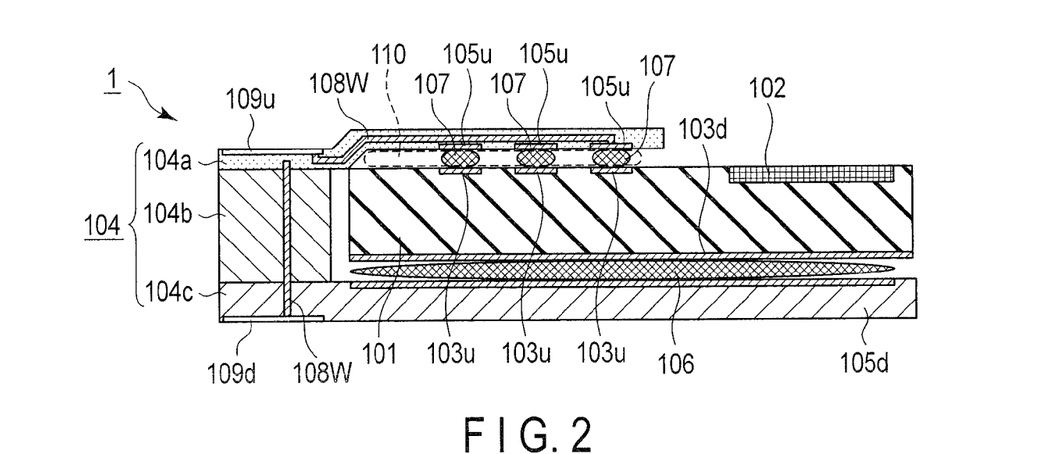
FIG. 2 is a side sectional view showing the optical sensor according to the first embodiment.

FIG. 2 is a side sectional view showing the optical sensor according to the first embodiment when viewed in a direction indicated by an arrow Y in FIG. 1. For descriptive convenience, main building components of the optical sensor according to the first embodiment are virtually visualized in the side sectional view shown in FIG. 2 (in other words, this side sectional view is not unique to a specific section).

An optical sensor 1 includes a chip 101, a photodetector 102, chip upper surface-side terminals 103u, a chip lower surface-side terminal 103d, a substrate 104, cover layer-side terminals 105u, a base layer-side terminal 105d, an adhesive 106, conductive members 107, wiring lines 108W, cover layer-side external terminals 109u, a base layer-side external terminal 109d, and a resin member 110.

The chip 101 is a substrate which supports the photodetector 102 serving as a main component of the optical sensor. The chip 101 is made of, e.g., a semiconductor, resin, or glass material.

If necessary, the chip 101 supports a signal processing circuit (not shown) which performs predetermined conversion processing and the like for all/some signals input/output between the photodetector 102 and the chip upper surface-side terminal 103u (to be described later), and a protective element (not shown) for electrically protecting the photodetector 102, signal processing circuit (not shown), and the like from static electricity and the like.

The lower surface (including the chip lower surface-side terminal 103d to be described later) of the chip 101 is bonded to (a base layer 104c of) the substrate 104 by the electrically conductive adhesive 106 made of an Ag paste, a metal preform (e.g., an Au- or Sn-based blazing metal), or the like. That is, the chip 101 is mounted on the substrate 104.

Note that the adhesive 106 need not be electrically conductive if the potential of the lower surface of the chip 101 need not be detected.

The chip upper surface-side terminal 103u is used to detect a signal from the photodetector 102, and is formed in the upper surface of the chip 101. In the example shown in FIG. 1, six chip upper surface-side terminals 103u are arranged in the upper surface of the chip 101. However, it suffices to arrange at least one chip upper surface-side terminals 103u, and the number of chip upper surface-side terminals 103u is arbitrary.

The chip lower surface-side terminal 103d is used to detect the potential of the lower surface of the chip 101. Note that the chip lower surface-side terminal 103d need not be electrically conductive if the potential of the lower surface of the chip 101 need not be detected. In this case, the chip lower surface-side terminal 103d may be arranged as a dummy terminal for simply holding the shape of the optical sensor 1.

The substrate 104 is a film-like substrate made of a flexible material (e.g., polyimide), and is formed from three layers, i.e., a cover layer 104a, a spacer layer 104b, and the base layer 104c.

More specifically, the substrate 104 is a film-like flexible substrate about 50 µm thick. The chip 101 is sealed in the substrate 104 by an arrangement to be described later, and functions as an optical sensor.

The optical sensor 1 can be formed to have a thickness of about 300 µm to 400 µm. Considering the fact that a conventional optical sensor has a thickness of about 0.5 mm for only the bottom, it can be understood that the optical sensor according to the first embodiment achieves a significantly small thickness. Also, a thick chip 101 for supporting the photodetector 102 is about 800 µm in thickness. From this, it is seen that reduction of the thickness implemented by the optical sensor 1 according to the first embodiment is remarkable.

Note that the thickness of the substrate 104 suffices to be a minimum one enough to hold minimum functions necessary for the optical sensor, such as electrical connection, insulation, and light shielding effect. That is, the substrate 104 is formed to be flexible not to limit the hardness of the optical sensor 1 by the substrate 104 itself.

The cover layer 104a includes the cover layer-side terminals 105u for electrical connection with the corresponding chip upper surface-side terminals 103u, and the cover layer-side external terminals 109u for electrical connection between the substrate 104 and the outside. Further, the cover layers 104a includes the wiring lines 108W serving as electrical connecting portions for electrically connecting the cover layer-side terminals 105u and the cover layer-side external terminals 109u.

As shown in FIGS. 1 and 2, the cover layer 104a is formed to have a shape/dimensions not to cover the upper portion of the photodetector 102. This allows light to enter the photodetector 102.

Note that the cover layer 104a may cover the entire upper surface of the chip 101 if a region of the cover layer 104a that corresponds to the upper portion of the photodetector 102 is made of a material which transmits light of a wavelength to be detected at a necessary ratio. Even a structure which coverts this region with a light-transmitting resin or a material having an optical filter effect can obtain an effect of preventing entrance of dust or the like into the optical sensor 1.

The base layer 104c includes the base layer-side terminal 105d which is electrically connected to the chip lower surface-side terminal 103d of the chip 101 via the adhesive 106, and the base layer-side external terminal 109d which is electrically connected to the chip upper surface-side terminals 103u of the chip 101 via the wiring lines 108W.

The cover layer-side terminal 105u is an electrode formed in the cover layer 104a, and is arranged at a position corresponding to each chip upper surface-side terminal 103u on a surface facing the chip 101. The cover layer-side terminal 105u transfers the potential of the chip upper surface-side terminal 103u to the substrate 104 via the conductive member 107 (details of which will be described later).

The base layer-side terminal 105d is an electrode formed in the base layer 104c, and is arranged at a position corresponding to the chip lower surface-side terminal 103d on a surface facing the chip 101. The base layer-side terminal 105d transfers the potential of the lower surface of the chip 101 to the substrate 104 via the adhesive 106.

Note that the chip lower surface-side terminal 103d, adhesive 106, and base layer-side terminal 105d need not be electrically conductive if the potential of the lower surface of the chip 101 need not be detected. In this case, the base layer-side terminal 105*d* is used to only align the chip 101.

The conductive member 107 is, e.g., an Au- or Sn-based metal ball or a resin or rubber conductive member with a structure which is electrically conductive in only the vertical direction (direction of thickness of the optical sensor 1). The conductive member 107 joins the chip upper surface-side terminal 103*u* and cover layer-side terminal 105*u* to electrically connect them.

An electrical signal generated by the photodetector 102 is transferred from the chip 101 to the substrate 104 via the conductive member 107.

The cover layer-side external terminal 109*u* is an electrode for electrical connection between the optical sensor 1 and the outside, and is made of a flexible material. The cover layer-side external terminal 109*u* is electrically connected to the chip upper surface-side terminal 103*u* via the wiring line 108W which is an electrical conductive portion formed in the cover layer 104*a*.

In the example shown in FIG. 1, four cover layer-side external terminals 109*u* are arranged. However, it suffices to arrange at least one cover layer-side external terminal 109*u*, and the number of cover layer-side external terminals 109*u* is arbitrary.

The base layer-side external terminal 109*d* is an electrode configured to detect the potential of the chip 101 even from the lower surface (base layer 104*c*) of the substrate 104. The base layer-side external terminal 109*d* is also made of a flexible material. The base layer-side external terminal 109*d* is electrically connected to the chip upper surface-side terminal 103*u* via the wiring line 108W which is an electrical conductive portion formed to extend through the cover layer 104*a*, spacer layer 104*b*, and base layer 104*c*. Note that the base layer-side external terminal 109*d* is not indispensable and is arranged as needed.

The resin member 110 is an electrically nonconductive resin member which is filled in a gap between the cover layer 104*a* and the chip 101 to adhere them, or an anisotropic conductive film (ACF) or the like which electrically connects terminals via the conductive members 107. The resin member 110 is arranged as needed, in order to increase the bonding strength between the chip upper surface-side terminal 103*u* and the cover layer-side terminal 105*u* via the conductive member 107, increase the strength of the structure of the optical sensor 1 itself, hold the structure shape, and assist the conductive member 107 or to provide an alternative function.

As described above, the first embodiment can provide a low-profile optical sensor while maintaining desired detection precision. More specifically, the first embodiment provides an optical sensor having the following effects.

The substrate 104 can be formed to have a thickness of about 50 μm, and even the bonding structure between the chip 101 and the substrate 104 can be formed to have a thickness of about 50 μm. An optical sensor almost equal in thickness to the chip 101 supporting the photodetector 102 can be substantially implemented. More specifically, if the chip 101 is about 250 μm thick, the whole optical sensor 1 can be formed to have a thickness of about 450 μm.

As described above, the substrate 104 is a film-like flexible substrate and can be bent at a portion except for one where the chip 101 exists. This can give a degree of freedom needed to mount it in the optical sensor 1.

As described above, the cover-side external terminal 109*u* and base layer-side external terminal 109*d* are formed from flexible materials. When fixing the optical sensor 1 to a flexible connector or the like, a substrate with a predetermined hardness may be adhered to or replaced with part of the substrate 104.

It suffices to appropriately set the width and length of the substrate 104 in accordance with those of the chip 101. When the dimensions (widthwise/lengthwise) of the optical sensor 1 can be designed with a margin, a spacer layer may be formed entirely or partially around the chip 101 in the margin space.

In the above-described example, the substrate 104 takes a three-layered structure of the base layer 104*c*, spacer layer 104*b*, and cover layer 104*a*. However, the substrate 104 may be formed from four or more layers. The materials of the respective layers may be different from each other.

After all the layers (in this example, the base layer 104*c*, spacer layer 104*b*, and cover layer 104*a*) are formed, other members such as the chip 101 may be assembled in the substrate 104. Alternatively, after some layers (e.g., the base layer 104*c* and spacer layer 104*b*) are formed, other members such as the chip 101 may be assembled in the substrate 104, and then the cover layer 104*a* may be formed, completing the final structure. That is, the assembly process of the optical sensor 1 is arbitrary.

Second Embodiment

An optical sensor according to the second embodiment of the present invention will be described. Differences from the optical sensor according to the first embodiment will be explained to avoid a repetitive description. One major difference from the optical sensor according to the first embodiment is the structure of a cover layer in a substrate which forms the optical sensor.

Figure 3:
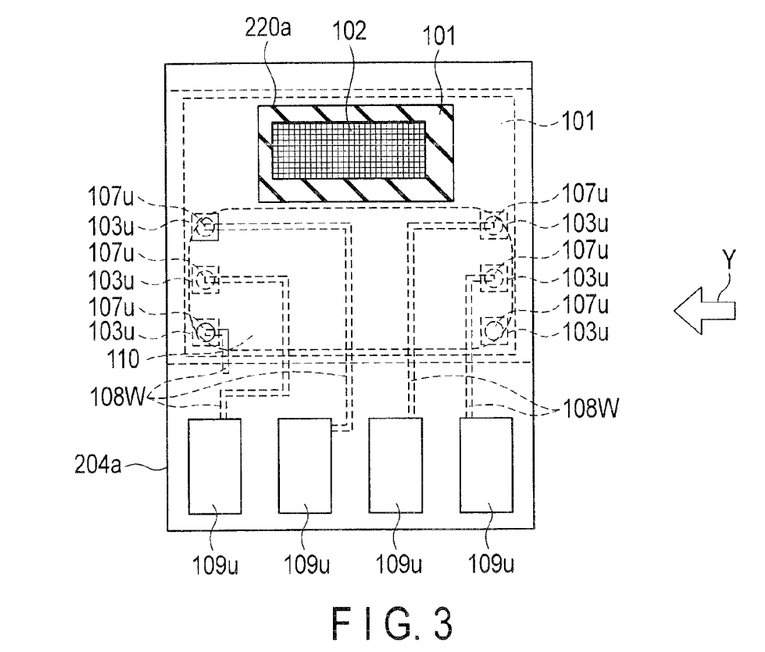
FIG. 3 is a plan view showing an optical sensor according to the second embodiment.

FIG. 3 is a plan view showing the optical sensor according to the second embodiment. In the plan view shown in FIG. 3, broken lines indicate building components which are invisible when the optical sensor is viewed from the top. For illustrative convenience, some building components are not illustrated.

Figure 4:
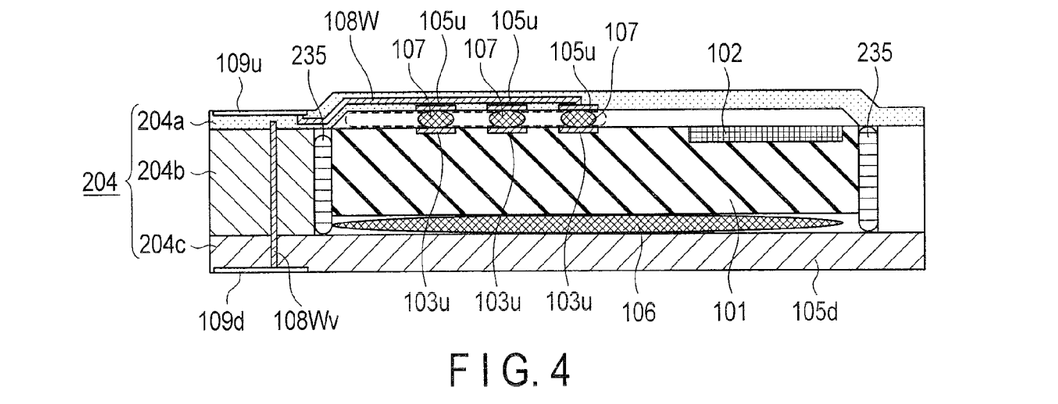
FIG. 4 is a side sectional view showing the optical sensor according to the second embodiment.

FIG. 4 is a side sectional view showing the optical sensor according to the second embodiment when viewed in a direction indicated by an arrow Y in FIG. 3. For descriptive convenience, main building components of the optical sensor according to the second embodiment are virtually visualized in the side sectional view shown in FIG. 4 (in other words, this side sectional view is not unique to a specific section).

A substrate 204 which forms an optical sensor 1 according to the second embodiment is formed from three layers, i.e., a cover layer 204*a*, spacer layer 204*b*, and base layer 204*c*, similar to the optical sensor 1 according to the first embodiment. The cover layer 204*a* which is a difference from the optical sensor 1 according to the first embodiment is configured as follows.

More specifically, the cover layer 204*a* is formed to cover the entire upper surface of a chip 101, and has an opening region 220*a* at a portion corresponding to the upper portion of a photodetector 102, as shown in FIG. 3. The opening region 220*a* allows light to enter the photodetector 102.

With this structure, the entire chip 101 can be sealed by surrounding it by the cover layer 204*a*, spacer layer 204*b*, and base layer 204*c*, as shown in FIGS. 3 and 4.

In the optical sensor 1 according to the second embodiment, a resin member 235 is filled in a gap between the chip 101 and the spacer layer 204*b*. This structure further improves reliability.

As described above, the second embodiment can provide an optical sensor which enhances the dust-proof effect, in addition to the same effects as those of the optical sensor according to the first embodiment.

Instead of forming the opening region 220a as a physical opening structure, the opening region 220a may be optically formed as a substantial opening portion by forming at least part of the cover layer 204a that corresponds to the upper portion of the photodetector 102, from a material (e.g., resin or glass) which transmits light of a wavelength to be detected by the photodetector 102 at a necessary ratio. This structure can further enhance the dust-proof effect.

When the opening region 220a is formed as a physical opening structure, the cover layer 204a may be made of a material which does not transmit light of a wavelength to be detected by the photodetector 102 exceeding a necessary ratio. This widens the range of choices of the material.

The following modification of the optical sensor 1 according to the second embodiment can give an encoder function to the optical sensor 1.

<<Modification>>

Figure 5:
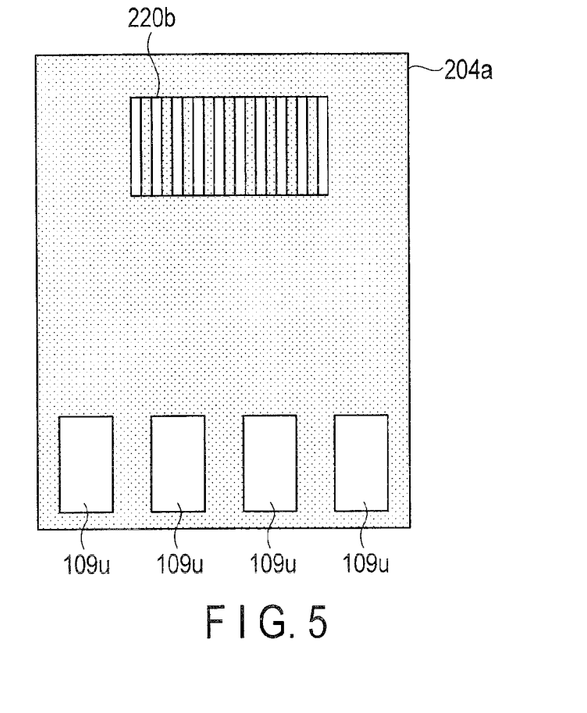
FIG. 5 is a plan view showing the cover layer of an optical sensor according to a modification to the second embodiment.

FIG. 5 is a plan view showing the structure of the cover layer 204a of the optical sensor 1 according to a modification to the second embodiment. In the plan view shown in FIG. 5, broken lines indicate building components which are invisible when the optical sensor is viewed from the top. For illustrative convenience, some building components are not illustrated.

As shown in FIG. 5, in this modification, the cover layer 204a is formed to cover the entire upper surface of the chip 101, and has a slit structure 220b at a portion corresponding to the upper portion of the photodetector 102, as shown in FIG. 3.

As described above, this modification can provide an optical sensor with the encoder function without changing the thickness and width of the optical sensor 1, in addition to the same effects as those of the optical sensor according to the second embodiment.

In place of forming the slit structure 220b as a physical slit structure, the slit structure 220b may be optically formed to substantially function as a slit using a material (e.g., resin or glass) which transmits light of a wavelength to be detected by the photodetector 102 at a necessary ratio, or a material (e.g., metal material or carbon-containing resin) which cuts off light. This structure can further improve the dust-proof effect.

Third Embodiment

An optical sensor according to the third embodiment of the present invention will be described. Differences from the optical sensor according to the second embodiment will be explained to avoid a repetitive description. One major difference from the optical sensor according to the second embodiment is the arrangement structure of an external terminal for electrical connection between the optical sensor and the outside.

Figure 6:
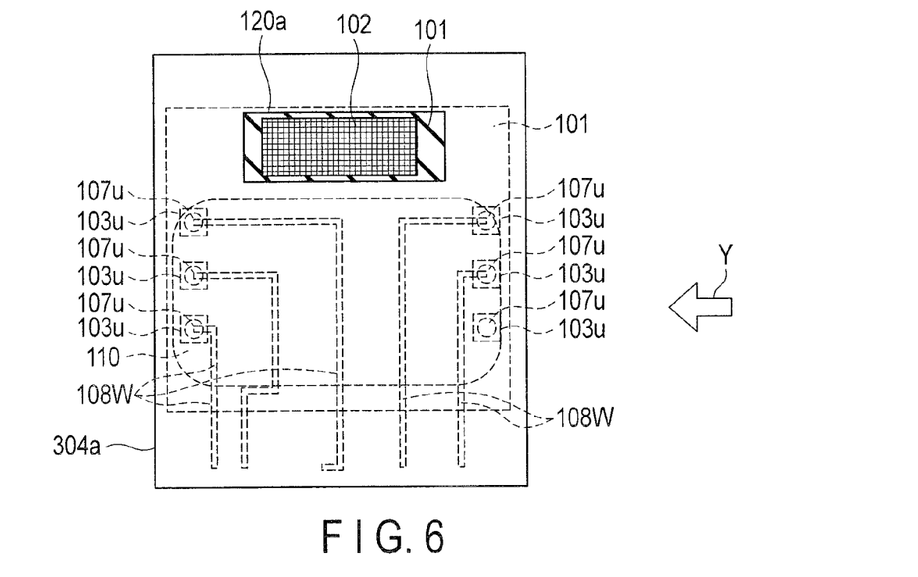
FIG. 6 is a plan view showing an optical sensor according to the third embodiment.

FIG. 6 is a plan view showing the optical sensor according to the third embodiment. In the plan view shown in FIG. 6, broken lines indicate building components which are invisible when the optical sensor is viewed from the top. For illustrative convenience, some building components are not illustrated.

Figure 7:
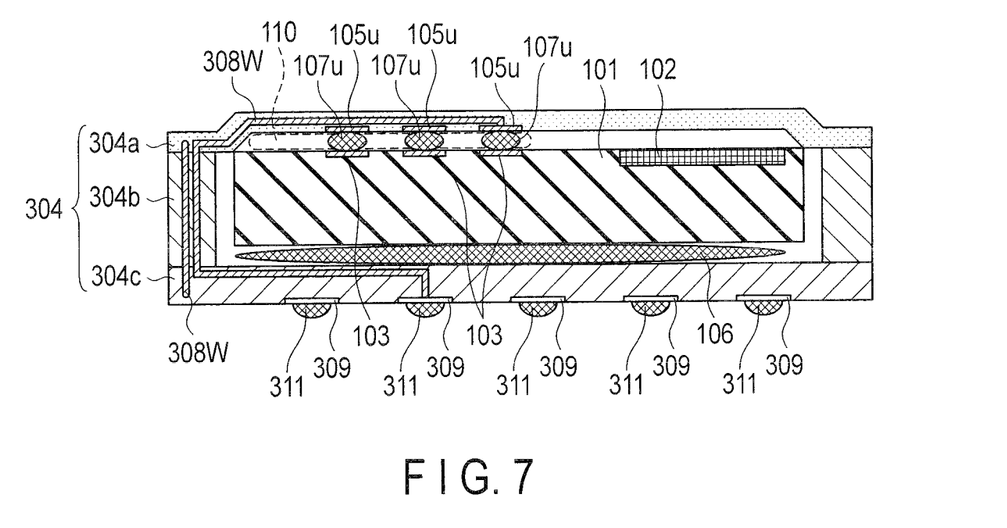
FIG. 7 is a side sectional view showing the optical sensor according to the third embodiment.

FIG. 7 is a side sectional view showing the optical sensor according to the third embodiment when viewed in a direction indicated by an arrow Y in FIG. 6. For descriptive convenience, main building components of the optical sensor according to the third embodiment are virtually visualized in the side sectional view shown in FIG. 7 (in other words, this side sectional view is not unique to a specific section).

As shown in FIGS. 6 and 7, in an optical sensor 1 according to the third embodiment, external terminals 309 for electrical connection between the optical sensor 1 and the outside are arranged at portions corresponding to the mounting region of a chip 101 in a base layer 304c of a substrate 304. That is, portions dedicated to arrange the external terminals 309 are not separately arranged on the substrate 304, and unoccupied portions of the base layer 304c are used.

Ball members 311 made of, e.g., Au or Sn are formed by bonding or the like on the respective external terminals 309. The external terminals 309 are electrically connected to the outside via the corresponding ball members 311. The external terminal 309 and ball member 311 are formed at almost the same size.

Each external terminal 309 is electrically connected to a corresponding cover layer-side terminal 105u via a wiring line 308W.

As described above, the third embodiment can provide an optical sensor which reduces the area (to an area almost equal to that of the chip 101), in addition to the same effects as those of the optical sensor according to the second embodiment. That is, the third embodiment can provide an optical sensor which achieves both low profile and small area.

Fourth Embodiment

An optical sensor according to the fourth embodiment of the present invention will be described. Differences from the optical sensor according to the second embodiment will be explained to avoid a repetitive description. An optical sensor according to the fourth embodiment is configured as an encoder.

Figure 8:
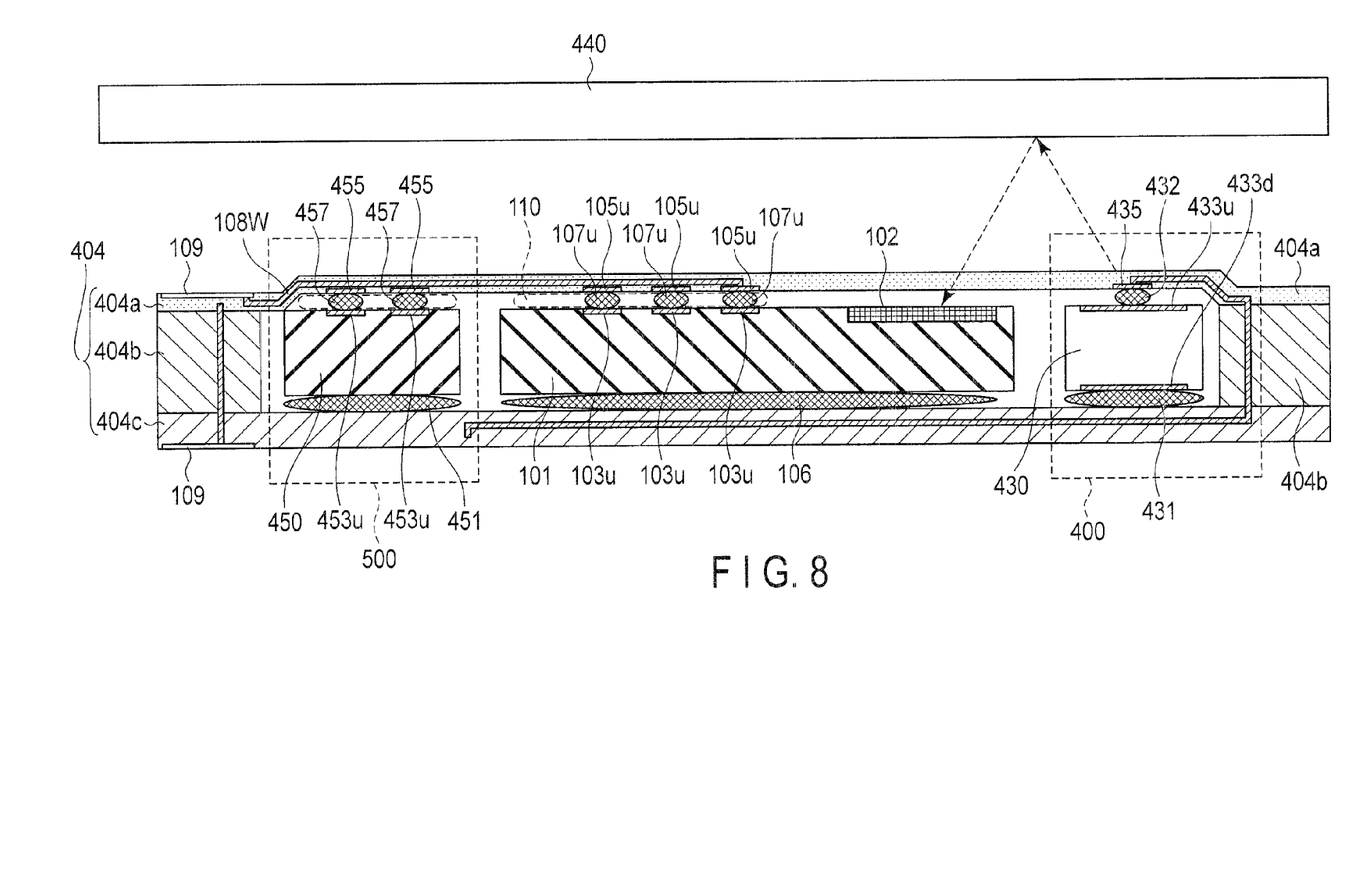
FIG. 8 is a side sectional view showing an optical sensor according to the fourth embodiment.

FIG. 8 is a side sectional view showing the optical sensor according to the fourth embodiment (corresponding to the side sectional view shown in FIG. 4 for the optical sensor according to the second embodiment).

As shown in FIG. 8, an optical sensor 1 according to the fourth embodiment further includes a light source portion 400, an encoder scale 440 having a pattern of a predetermined cycle to detect a displacement, and a functional portion 500.

The light source portion 400 includes a light source 430 (e.g., LED or SEL) disposed in a substrate 404, an upper surface electrode 433u formed in the upper surface of the light source 430, a lower surface electrode 433d formed in the lower surface of the light source 430, a light source terminal 435 formed in a cover layer 404a, a conductive member 432 which electrically joins the upper surface electrode 433u of the light source 430 and the light source terminal 435 of the cover layer 404a, and a conductive paste 431 which electrically joins the lower surface electrode 433d of the light source 430 and a base layer 404c.

The light source 430 is disposed in the substrate 404 so that its light-projecting surface becomes flush with the light-receiving surface of a photodetector 102. In the example shown in FIG. 8, the light source 430 is of a type which establishes an electrical connection for light emission/oscillation by the upper surface electrode 433u formed in the upper surface of the light source 430 and the lower surface electrode 433d formed in its lower surface.

Note that the light source 430 may be configured as a type which establishes an electrical connection for light emission/oscillation by only the upper surface electrode 433u or by only the lower surface electrode 433d.

The conductive member 432 is a metal ball made of, e.g., Au or Sn, or a resin or rubber member with a structure which is electrically conductive in only the vertical direction.

In this structure, light emitted/oscillated by the light source 430 irradiates the periodic pattern of the encoder scale 440, and is reflected by the encoder scale 440. The photodetector 102 receives the reflected light.

If a grid is required above the light source 430, it suffices to form a slit in the cover layer 404a, like the slit 220b of the cover layer 204a in the optical sensor 1 according to the second embodiment. In other words, the above-mentioned second embodiment is applied to the cover layer 404a.

The optical sensor with the above structure according to the fourth embodiment functions as an encoder which outputs a periodic analog signal (e.g., almost sine wave signal or almost triangular wave signal), or an encoder which performs binarization processing for the analog signal and multiplication processing and the like for improving resolving power, and outputs a displacement as a signal countable by a digital counter.

Functions regarding these signal processes may be implemented by a chip 101. Alternatively, as shown in FIG. 8, the functional portion 500 which is an independent component may have some functions (e.g., multiplication processing function) and be disposed in the substrate 404.

The functional portion 500 includes a functional component 450 disposed in the substrate 404, upper surface electrodes 453u formed in the upper surface of the functional component 450, functional component terminals 455 formed in the cover layer 404a, conductive members 457 which electrically join the upper surface electrodes 453u of the functional component 450 and the functional component terminals 455 of the cover layer 404a, and a paste 451 which joins the lower surface of the functional component 450 and the base layer 404c.

Note that the number of functional portions 500 is arbitrary, and a desired number of functional portions 500 may be arranged. Functions to be implemented by the functional portion 500 are, e.g., an origin detection function and absolute position detection function. The functional portion 500 may be disposed at a position spaced apart from or close to the chip 101 or light source 430.

As described above, the fourth embodiment can provide a low-profile optical encoder while maintaining desired precision. More specifically, the fourth embodiment can provide an optical encoder which is very thin in accordance with the thicknesses (e.g., about 250 μm) of the chip 101 and light source 430 serving as main components of the optical encoder.

<<Modification>>

In the example shown in FIG. 8, the light source 430 and chip 101 are formed to have almost the same thickness. This makes the light-projecting surface of the light source 430 and the light-receiving surface of the photodetector 102 be flush with each other.

Figure 9:
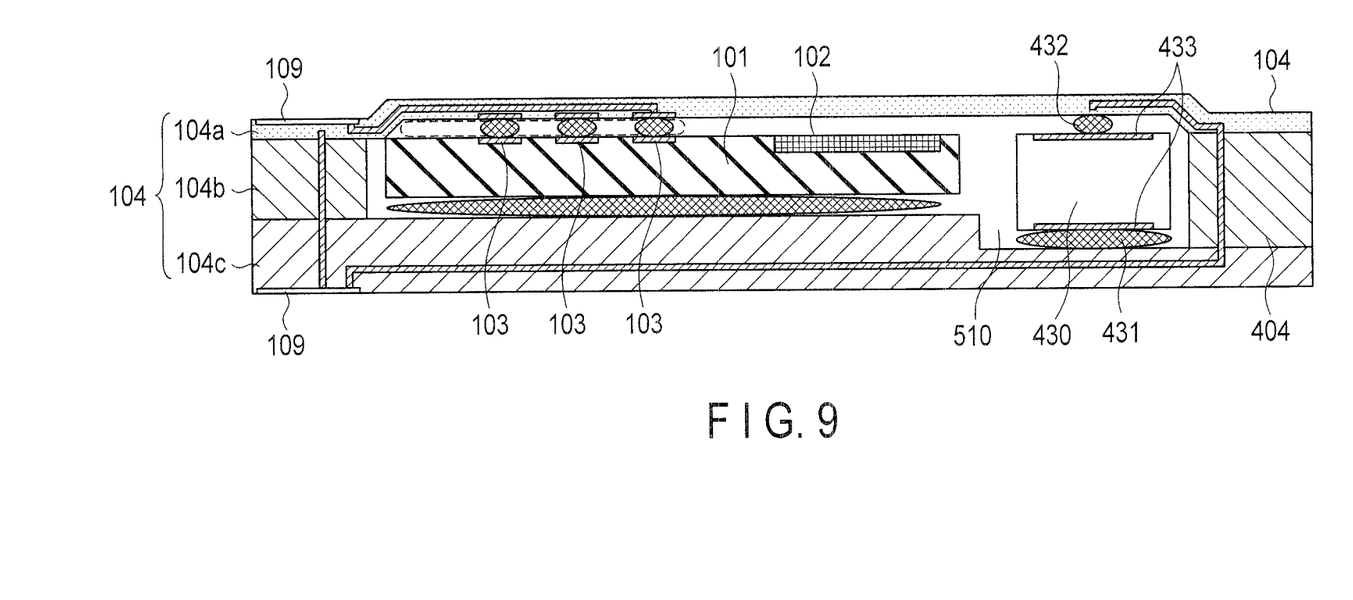
FIG. 9 is a side sectional view showing an optical sensor according to a modification to the fourth embodiment.

However, even if the thicknesses of the light source 430 and chip 101 differ from each other, the light-projecting surface of the light source 430 and the light-receiving surface of the photodetector 102 can be adjusted to be flush with each other by forming a step portion 510 in the base layer 404c, as shown in FIG. 9.

The present invention has been described based on the first to fourth embodiments. However, the present invention is not limited to the above-described embodiments, and can be variously modified and applied without departing from the scope of the invention.

Further, the above-described embodiments include inventions on various stages, and various inventions can be extracted by an appropriate combination of building components disclosed. For example, even if several building components are omitted from all those described in the embodiments, an arrangement from which the building components are omitted can also be extracted as an invention as long as the problems described in Description of the Related Art can be solved and effects described in BRIEF SUMMARY OF THE INVENTION can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical sensor comprising:
a photodetector which detects light;
a chip which supports the photodetector; and
a substrate in which the chip is sealed and includes at least three laminated layers including a cover layer, a spacer layer, and a base layer,
wherein the substrate includes an electrical conductive portion for the photodetector.

2. The sensor according to claim 1, wherein the substrate comprises a flexible material.

3. The sensor according to claim 1, wherein the cover layer includes a light-transmitting/passing portion which transmits or passes light.

4. The sensor according to claim 3, wherein the light-transmitting/passing portion is an opening region formed at a portion of the substrate that faces the photodetector.

5. The sensor according to claim 3, wherein the light-transmitting/passing portion includes a slit-like region formed at a portion of the substrate that faces the photodetector.

6. The sensor according to claim 1, wherein a light source which emits light toward outside of the substrate is received in the substrate.

7. An optical sensor comprising:
a photodetector which detects light;
a substrate in which the photodector is buried and includes at least three laminated layers including a cover layer, a spacer layer, and a base layer, a light source which emits light toward outside of the substrate being received in the substrate;
an encoder scale which is irradiated by the light source; and
a signal generation portion which detects a relative displacement between the encoder scale and the photodetector, and generates a substantially sine wave analog signal having two phases different by 90°,
wherein the substrate includes an electrical conductive portion for the photodetector, and
the photodetector and the light source are buried in the substrate to make a light-receiving surface of the photodetector and a light-projecting surface of the light source be parallel to each other.

8. The sensor according to claim 7, wherein the signal generation portion includes a functional component received in the substrate.

9. The sensor according to claim 7, wherein the light source and the photodetector have the substantially equal thickness.

10. The sensor according to claim 7, wherein the base layer has a thickness enough to make the light-receiving surface of the photodetector and the light-projecting surface of the light source be parallel to each other.

* * * * *